(12) United States Patent
Shepard

(10) Patent No.: US 9,740,870 B1
(45) Date of Patent: Aug. 22, 2017

(54) ACCESS CONTROL

(71) Applicant: Amazon Technologies, Inc., Reno, NV (US)

(72) Inventor: Isaac Jeremy Shepard, Ladera Ranch, CA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 14/098,376

(22) Filed: Dec. 5, 2013

(51) Int. Cl.
- G06F 21/00 (2013.01)
- H04L 29/06 (2006.01)
- G06F 21/60 (2013.01)
- G06F 21/10 (2013.01)
- G06F 21/62 (2013.01)
- G06F 17/30 (2006.01)
- G06F 21/31 (2013.01)

(52) U.S. Cl.
CPC ............ G06F 21/60 (2013.01); G06F 21/604 (2013.01); G06F 21/31 (2013.01); G06F 21/6209 (2013.01)

(58) Field of Classification Search
CPC .... G06F 21/60; G06F 21/604; G06F 21/6209; G06F 21/31
See application file for complete search history.

(56) References Cited

U.S. PATENT DOCUMENTS

| 8,805,884 | B2 * | 8/2014 | Faitelson | G06F 21/6218 707/784 |
| 2004/0078568 | A1 * | 4/2004 | Pham et al. | 713/165 |
| 2006/0267857 | A1 * | 11/2006 | Zhang et al. | 345/1.1 |
| 2009/0138703 | A1 * | 5/2009 | Schneider | G06F 21/31 713/155 |

FOREIGN PATENT DOCUMENTS

IL   GB 2458568 A * 9/2009 ............ G06F 21/10

OTHER PUBLICATIONS

Emil Stefanov, Mikhail Atallah; "Duress detection for authentication attacks against multiple administrators"; Oct. 2010; Insider Threats '10: Proceedings of the 2010 ACM workshop on Insider threats; Publisher: ACM; pp. 37-46.*

* cited by examiner

Primary Examiner — David Cervetti
Assistant Examiner — Courtney Fields
(74) Attorney, Agent, or Firm — Thorpe North & Western, LLP

(57) ABSTRACT

An access control technology is described. Ownership control information is stored for an object in a computing system. Access control to objects in the computing system is based in part on accounts having ownership control of objects in the computing system. A first account with ownership control of the object is identified. Ownership control of the object is changed to a second account upon detection of a first security event. Ownership control of the object is restored to the first account upon detection of a second security event using the stored ownership control information.

20 Claims, 13 Drawing Sheets

```
                  ┌─ 304    ┌─ 306              ┌─ 302
-rwxr-xr-x 1 root root    105176 May  7 22:53 a2p                      300
-rwxr-xr-x 1 root root     21160 Jan 15  2011 ac
-rwxr-xr-x 1 root root     14984 Jan 15  2011 acpi_listen
-rwxr-xr-x 1 root root     23488 Jan 16  2011 addftinfo
-rwxr-xr-x 1 root root     69688 Jan  5  2012 afs5log
-rwxr-xr-x 1 root root      1786 Feb 27  2013 apropos
-rwxr-xr-x 1 root root     11988 May  7 02:24 asadmin
-rwxr-xr-x 1 root root     28096 Jan  6  2012 aserver
-rwsr-xr-x 1 root root     54240 Jan 17  2011 atl
-rwxr-xr-x 1 root root     10400 Jan  5  2012 attr
-rwxr-xr-x 1 root root     14016 Jul  7  2012 aulast
-rwxr-xr-x 1 root root      9152 Jul  7  2012 aulastlog
-rwxr-xr-x 1 root root      7464 Jul  7  2012 ausyscall
-rwxr-xr-x 1 root root     29728 Jul  7  2012 auvirt
lrwxrwxrwx 1 root root        14 May  9 20:02 awk -> ../../bin/gawk
-rwxr-xr-x 1 root root       749 May  7 02:32 aws
-rwxr-xr-x 1 root root     29240 Jul  7  2012 base64
-rwxr-xr-x 1 root root      6970 Feb 27  2013 bashbug-64
-rwxr-xr-x 1 root root       137 Jan 17  2011 batch
-rwxr-xr-x 1 root root     82528 Jan 18  2011 bc
-rwxr-xr-x 1 root root     66080 Oct 23  2012 berkeley_db_svc
-rwxr-xr-x 1 root root      1538 Mar 12  2013 build-classpath
-rwxr-xr-x 1 root root       383 Sep 19  2006 build-classpath-directory
-rwxr-xr-x 1 root root      1572 Sep 19  2006 build-jar-repository
-rwxr-xr-x 1 root root      1554 May  7 02:24 bundle_image
lrwxrwxrwx 1 root root         5 May  9 20:02 bunzip2 -> bzip2
lrwxrwxrwx 1 root root         5 May  9 20:02 bzcat -> bzip2
lrwxrwxrwx 1 root root         6 May  9 20:02 bzcmp -> bzdiff
-rwxr-xr-x 1 root root      2128 Jan 15  2011 bzdiff
-rwxr-xr-x 1 root root      1677 Jan 15  2011 bzgrep
-rwxr-xr-x 1 root root     32936 Jan 15  2011 bzip2
-rwxr-xr-x 1 root root     10872 Jan 15  2011 bzip2recover
lrwxrwxrwx 1 root root         6 May  9 20:02 bzless -> bzmore
-rwxr-xr-x 1 root root      1259 Jan 15  2011 bzmore
-rwxr-xr-x 2 root root     36601 May  7 22:52 c2ph
-rwxr-xr-x 1 root root     17088 Mar  2  2013 call
rwxrwxrwx  1 root root         3 May  9 20:02 captoinfo -> tic
-rwxr-xr-x 1 root root      3384 Feb 27  2013 catchsegv
-rwxr-xr-x 1 root root    143320 Feb 28  2013 certutil
-rwxr-xr-x 1 root root      3442 May  7 02:24 cfadmin
-rwxr-xr-x 1 root root     14592 Jan  5  2012 chacl
-rwsr-xr-x 1 root root     66352 Jan  5  2012 chage
```

FIG. 3

ACCESS CONTROL

BACKGROUND

Computer security includes mechanisms by which computer equipment, information and services are protected from unintended or unauthorized access, change or destruction. One type of computer security mechanism is file system access control. Some computer file systems, for example, have methods of assigning permissions or access rights to specific users and groups of users. For instance, a computer file system may allow or restrict certain users from making changes to content within the file system. In another example, a directory service such as the lightweight directory access protocol (LDAP) may be used to control access to services on a corporate network.

Computer security is often multi-faceted. Border protection between a corporate network and the Internet, for instance, may be protected with a computer firewall. In another layer of security, a corporate computer server may require authentication credentials before allowing access to the server. A further aspect of computer security may be physical security of computer equipment from unauthorized persons. With the growing interconnectedness of computing system, there is an increased need for providing effective computer security.

BRIEF DESCRIPTION OF THE DRAWINGS

FIG. 3 is an example listing of a file system directory that displays ownership control information and access permissions information.

DETAILED DESCRIPTION

An access control technology is described that may provide additional security to various objects in a computer environment. One example of objects that may be secured in a computing environment is file system objects within a file system. The technology allows automatic modification of ownership control and access permissions to directories and/or files within a file system based on the presence of authenticated users. For example, when a user logs out of a computing system, the system may automatically change ownership control (e.g. 'chown' in Unix-like systems) of a file system object. Moreover, the system may change access permissions (e.g. 'chmod' in Unix-like systems) of the file system object to increase security by restricting access, for example, to read-only access.

In a Unix-like system, ownership control of a user X's file systems objects may be changed, for example, to the root user or an administrator user upon user X logging out of the system. Upon logging into the system again, user X's file system objects may be restored to user X (i.e., to what they were before user X logged out of the system) by changing ownership control of the file system objects from the root user to user X. This mechanism may in some instances be entirely transparent to user X. Ownership control may also include shared ownership control through, for example, group ownership of an object.

In addition to changing and/or restoring ownership control of file system objects based on a user logging in or logging out of a computing system, ownership control may be changed and/or restored based on other criteria. Security events may determine when ownership control should be changed and/or restored. Some examples of security events in a file system include changes to a present working directory (e.g., PWD) of a user, changes to a list of file system objects or rules as security, other actions, or as business rules may dictate. In a more general sense, a security event may include any type of access entry point. Examples of entry points are: entry into a computing system, entry into a directory, file reads and writes, access to a database or other resources. A security event, however, may not include administrator events (e.g. chmod, chusr directly, file object creation or deletion).

By changing ownership control of objects to a more secure account such as root, some computer security vulnerabilities may be removed. For example, one technique that is sometimes used to compromise computing systems is the finding of security holes in programs which allow a process to run as another user. In particular some examples of exploits include structured query language (SQL) injection and code injection amongst others. By changing ownership control of objects to a more secure account, an attacker generally may have to go through the usual authentication process within the computing system.

Figure 1:
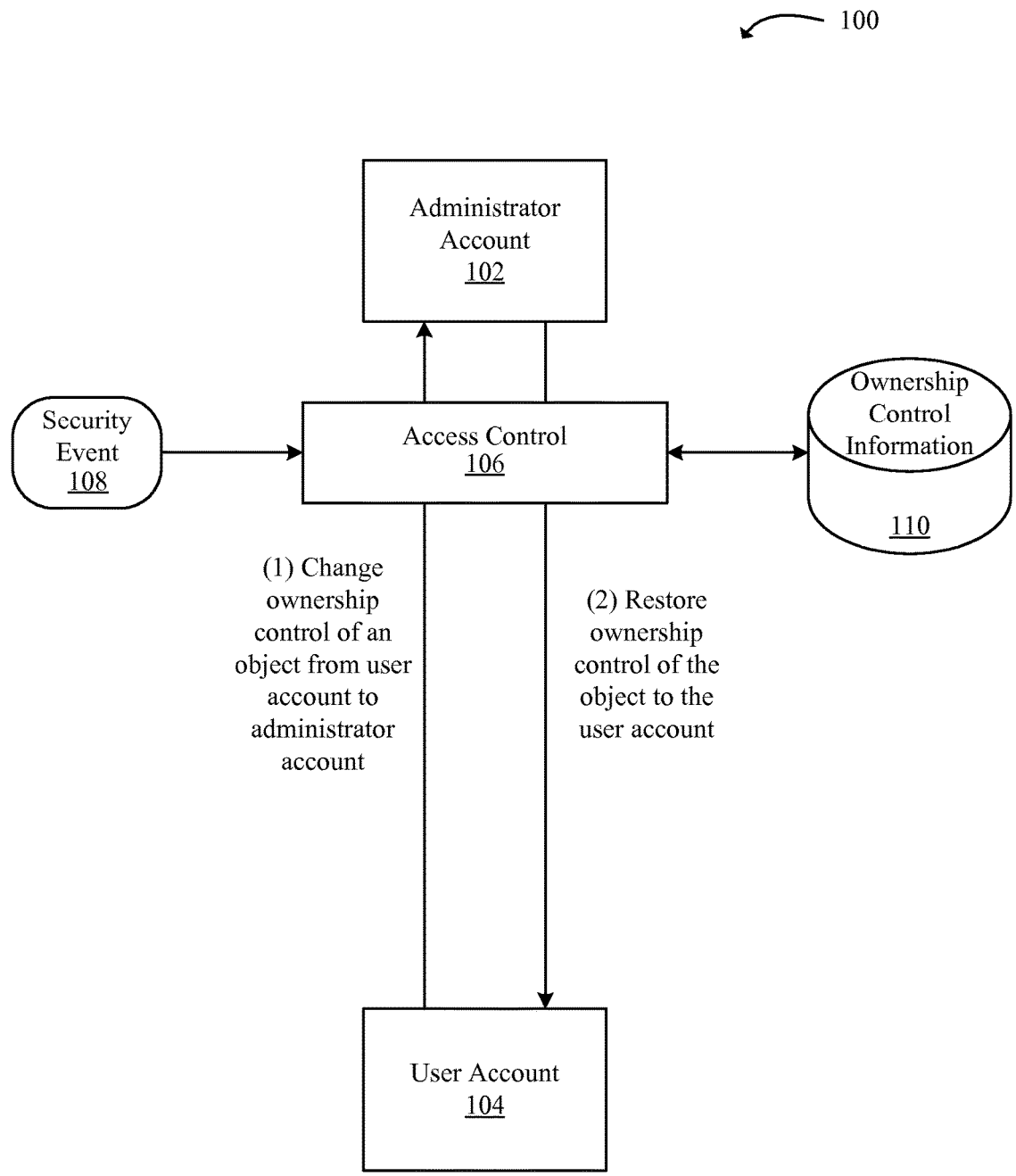
FIG. 1 illustrates an overview of access control in an example.

To more clearly describe the technology, examples are now provided with reference to the figures. Accordingly, FIG. 1 illustrates an example of a schematic overview 100 of access control modifications. In a first step, a user account 104 may change ownership control of an object from the user account 104 to an administrator account 102. Generally this change of ownership control may be based in part on a security event 108 such as the user account 104 logging out of a computing system. In one example the object may be a file system object within a computer file system. The object, however, in other examples may include other types of computer related objects secured through access control including application programming interfaces (APIs) and directory services (e.g. LDAP) amongst others.

In the second step, ownership control of the object may be restored from the administrator account 102 to the user account 104. Generally this restoration of ownership control may be based in part on the security event such as the user account 104 logging back into the computing system. Ownership control information for the object generally may need to be stored in an ownership control information data store 110 so that the correct user accounts may be restored to ownership control of the correct objects. In a file system example, ownership control information may include which user should have ownership control of a file system object and which group should have group control of the file system object. These steps or changing ownership and restoring ownership may be carried out by an access control module 106 as depicted, for example.

Access permission information may also be stored. Access permission information, for instance, may include which access permissions the user should have with the file system object and which access permissions the group should have with the file system object. In Unix-like systems such as Linux, access control is divided into three classes: user, group and other users. Three types of access permissions are assigned to those three access control classes, namely read, write and execute. In this way a file system may define which users may do what with specific file system objects in the file system. Such permissions may be modified upon a security event, as described earlier.

In some configurations, the administrator account 102 may be more secure than the user account 104. For example the administrator account 102 may have to go through a more rigorous authentication process in order to gain access to the computing system. In one example, the administrator account 102 may log into the computing system through secure shell (SSH) using a key such as a Rivest-Shamir-Adleman (RSA) key or digital signature algorithm (DSA) key. In another example, the administrator account 102 may log into the computing system through a physical terminal attached to the computing system through a serial port. Other means to make the administrator account 104 more secure may include biometric authentication, strong password authentication, smart card authentication, hardware dongles or any other security hardening mechanism. By making the administrator account 104 more secure and by changing ownership control of the object to the administrator account, an attacker may have to go through the normal authentication process in order to access the object.

Figure 2A:
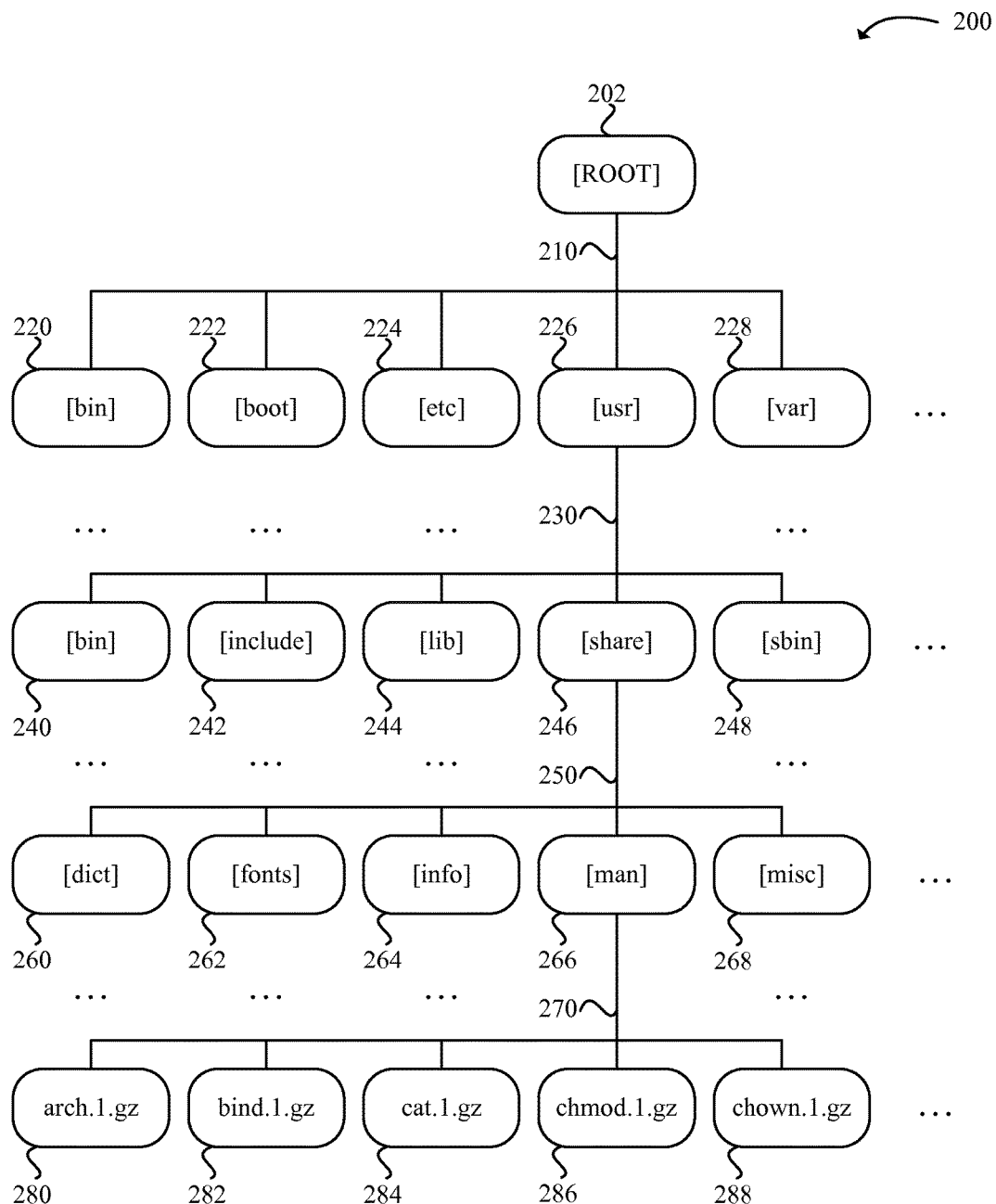
FIG. 2A illustrates a directory structure of an example file system that may be secured using access control.

FIG. 2A illustrates a directory structure 200 of an example file system that may be secured using access control. The directory structure 200 has a root directory 202 that contains, as indicated by 210, a plurality of file system objects. In particular the root directory 202 contains the bin directory 220, the boot directory 222, the etc directory 224, the usr directory key 26 and the var directory 228. Likewise directories 240, 242, 244, 246, 248, 260, 262, 264, 266, 268 are subdirectories as respectively indicated by 230, 250 and 270. Moreover files 280, 282, 284, 286, 288 may be contained within the man directory 266.

The ellipses (i.e. ' . . . ') throughout FIGS. 2A and 2B indicate that the directory structure 200 is exemplary and may include other objects. In FIG. 2A, for instance, the root directory 202 may include other files and directories than those depicted in the figure. Moreover, the depicted file system objects in FIG. 2A are merely illustrative of a file system directory structure.

Often in a file system, access control is applied to each file system object (e.g. directories and files 240, 242, 244, 246, 248, 260, 262, 264, 266, 268, 280, 282, 284, 286, 288). In computing systems such as Linux and Microsoft® Windows NT® based systems, access control may be based on user accounts, group account or roles within the computing system. In Linux in particular, read, write and execution permissions may be assigned (i.e. either permitted or denied) to a file system object for a particular user account and particular group account. In addition, read, write and execution permissions may be assigned to the file system object for other user accounts on the computing system. Execution of a directory in Linux may mean the ability to enter the directory or list file system objects within the directory.

Using the disclosed technology, one way of providing extra security to a file system object may be to change access permissions to the file system to read-only by denying write and execution permissions for the file system object to all accounts within the computing system. This may be particularly useful in instances where the computing system may be largely used in a read-only fashion. Some Internet sites, for instance are often largely operated in a read-only fashion. Once setup, an Internet site may only be occasionally edited. An Internet site administrator may, therefore, wish to secure all or at least a portion of the Internet site's files when not logged into the computing system hosting the Internet site. For example, the Internet site's files may be restored to read-write permission when the Internet site administrator is logged in through SSH. By changing the access permissions of the Internet site's files to read-only, the Internet site may be less vulnerable to attacks such as Internet site vandalism. More generally, a user of the computing system may have a greater level of security by changing the access permissions of the user's file system objects to read-only.

Figure 2B:
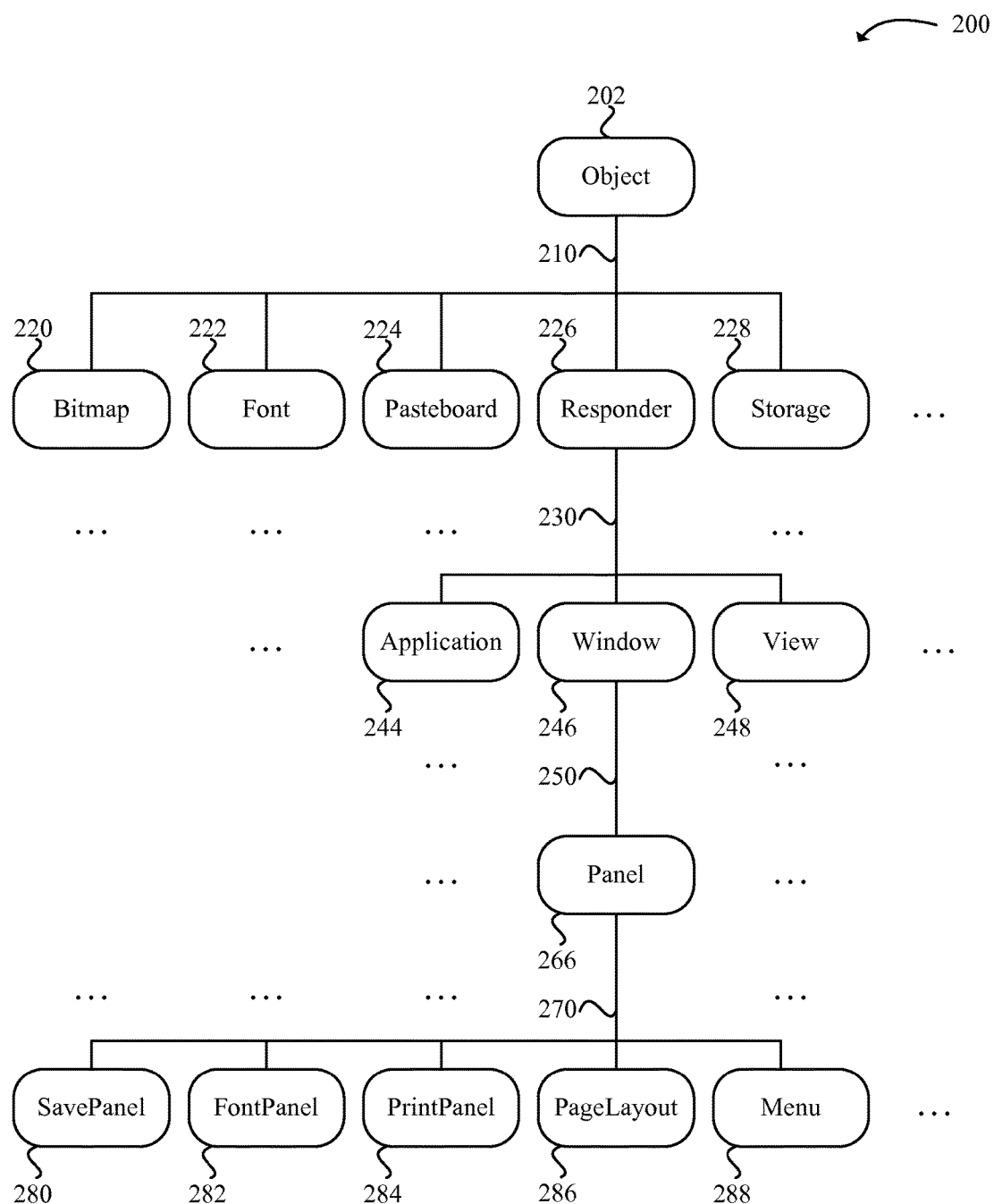
FIG. 2B illustrates an object hierarchy of an example object-based system that may be secured using access control.

FIG. 2B illustrates an object hierarchy 200 of an example object-based system that may be secured using access control. In addition to providing file system access control, the technology may also be used to control access to any type of account-based security mechanism. One such example may be a hierarchy of system objects within an object-oriented operating system such as NeXTSTEP™ as depicted in FIG. 2B. Thus, ownership and permissions for object in this object hierarchy 200 may be removed upon a security event, such as a user logout, and then the ownership and permissions may be added back to the object upon a security event, such as user login.

To change ownership control of objects such as those depicted in FIG. 2B, ownership control information for an object may be stored. More particularly, the user that has ownership control of the object may need to be stored. Once ownership control information has been stored, ownership control of the object may be changed to another user (e.g., administrator or root). The change of ownership control may occur when a security event has been detected. Likewise, to restore the stored ownership control of the object to the user, another security event may be detected to trigger the restoration of the ownership control to the user.

Another example where the technology may be used is within database management system (DBMS) software. Some DBMS provide means to create user accounts and assign data definitions, data queries, data manipulation and transaction permissions to user accounts. The technology may be particularly useful in protecting some types of databases. Some databases may be largely used in a read-only fashion. A database containing standardized U.S. state postal abbreviations, for example, may change rarely. Therefore, once the database is setup, the database may rarely change. An Internet site administrator may, therefore, desire to secure all or at least a portion of the Internet site's database files when not logged into the computing system hosting the Internet site. By changing the access permissions of the database to read-only, the database may be more immune to attacks such as SQL injection.

FIG. 3 is an example listing 300 of a file system directory that displays ownership control information and access permissions information. As indicated previously, in Linux, access control may be divided into three classes: user, group and other users. Three types of access permissions are assigned to those three access control classes, namely read, write and execute. As seen in the listing 300, each file system object listed towards the right side 302 of the listing 300 is assigned access permissions to each class of access control class as listed towards the left side 304 of the listing 300.

For example, the file "a2p" is assigned the access permissions indicated "-rwxr-xr-x". Reading"-rwxr-xr-x" from left to right, the first triad (e.g. "rwx") indicates that the user who has ownership control of the file "a2p" has read, write and execution access permissions. The second triad (e.g. the middle "r-x") indicates that the group who has group control of the file "a2p" has both read and execution access permissions. The third triad (e.g. the last "r-x") indicates that other users of the computing system have read and execution access permissions. In this way a file system may define which users may do what with the file "a2p". The character before the first triad indicates the file system object type. For example, a "d" may indicate that the file system object is a directory, while a "-" indicates that the file system object is a file.

Moreover, the listing 300 also displays the user who has ownership control and the group that has group control of each listed file system object, as shown by 306. For example, the file "a2p" displays "root root" which means that a user account "root" has ownership control of the file "a2p" and that a group also named "root" has group control of the file "a2p". Since the files shown in the listing 300 depict root as having ownership control of the file system objects, all of the depicted file system objects may have changed ownership control from a first user to root upon detection of a first security event (e.g. the first user logging out). Thus, when a second security event occurs (e.g. the first user logging back in), then ownership control of the depicted file system objects may be restored to the first user. Ownership control information for the file system objects may have been previously stored, so that restoration of ownership control can be properly applied upon detection of the second security event.

Figure 4:
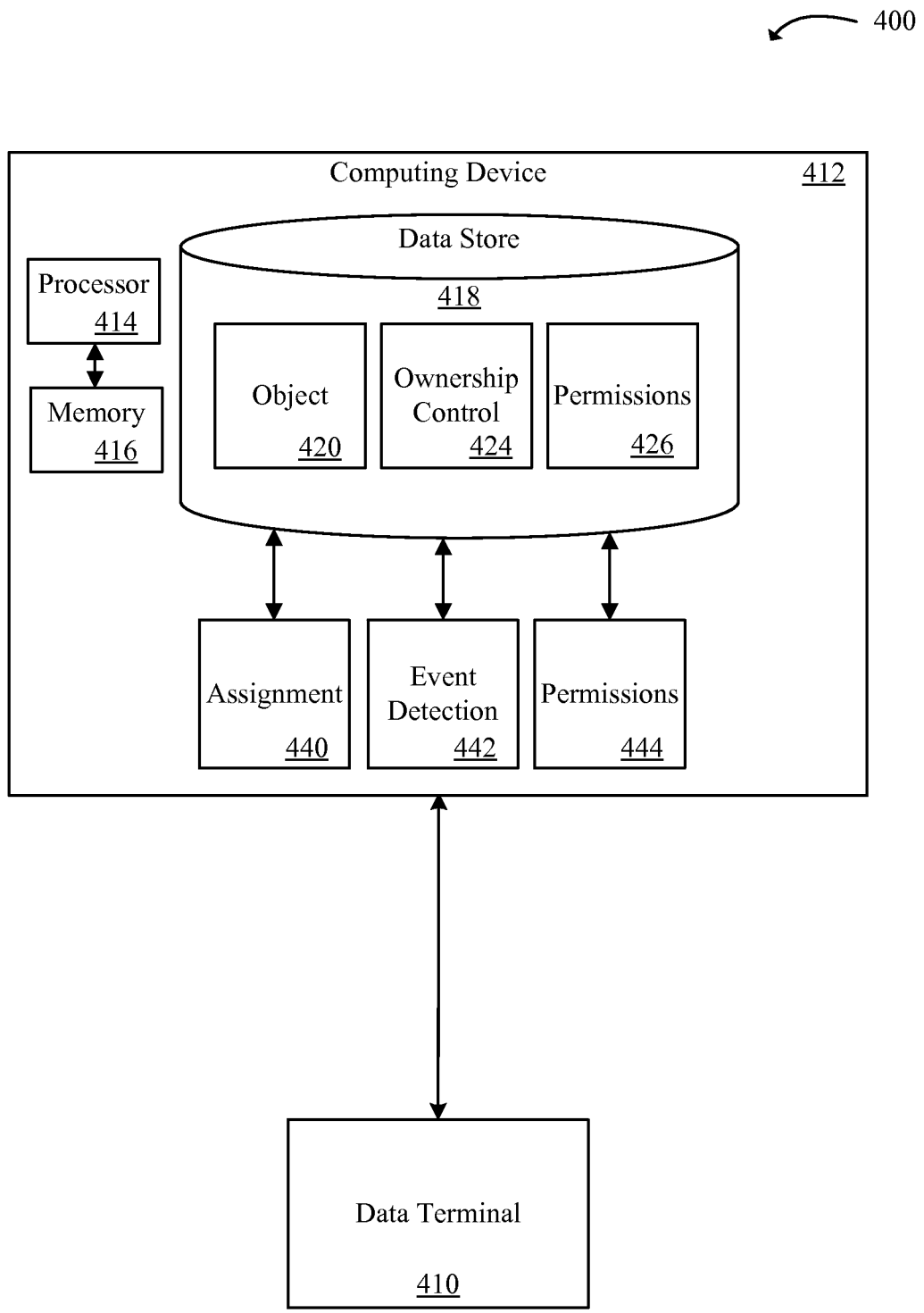
FIG. 4 is a component block diagram illustrating an example system to control access.

FIG. 4 is a component block diagram illustrating an example system 400 to control access. The system 400 may be used to implement the functionality heretofore described with reference to FIGS. 1-3 or other exemplary functionality discussed below, including functionality described with reference to FIGS. 5-11. The system 400 may include a computing device 412 and a data terminal 410 communicatively connected to the computing device 412. The data terminal 410 may be directly connected to the computing device 412 as depicted (e.g. through a serial port) or the data terminal 410 may be communicatively connected to the computing device 412 over a network. For example, the data terminal may be a SSH terminal communicatively connected to the computing device 412 over the Internet through the transmission control protocol (TCP).

Where a network is employed, the network may include any useful computing network, including an intranet, the Internet, a local area network (LAN), a wide area network (WAN), a wireless data network, or any other such network or combination thereof, and may utilize a variety of protocols for transmission thereon, including for example, Internet Protocol (IP), the transmission control protocol (TCP), user datagram protocol (UDP) and other networking protocols. Components utilized for such a system may depend at least in part upon the type of network and/or environment selected. Communication over the network may be enabled by wired or wireless connections and combinations thereof.

The computing device 412 may be one example of a computing system having access control to objects based in part on user accounts having ownership control of objects in the computing system. The computing device 412 may provide some central server processing services while the data terminal 410 may provide local processing services and interface processing services to interface with the services of the computing device 412. Therefore, it is envisioned that processing services, as discussed herein, may be a centrally hosted functionality, a virtualized service and/or an independent service application that may receive requests and provide output to other services or devices. Thus, while the example processing arrangement in the system 400 between the computing device 412 and the data terminal 410 is described in detail below, other processing sharing is also envisioned where some or a significant portion of the processing is on a data terminal 410.

The computing device 412 may include a processor 416 and a memory 412. The computing device 412 may also include a data store 418 having various information stored therein. For example, the data store 418 may include an object data store 420, an ownership control data store 422, a permissions data store 424 and other data stores to implement functionality described herein. Additionally, the computing device 412 may include various modules such as an assignment module 440, an event detection module 442, a permissions module 444 and other modules to implement functionality described herein.

The object data store 420 may store references to objects in a computing system. The ownership control data store 424 may store ownership control information about an object referenced in the object data store. Access control to objects referenced in the object data store may be based in part on accounts on the computing system having ownership control of objects in the object data store. File system objects in a file system, as one example, may designate a user that has ownership control of a file system object. Ownership control information may need to be stored before changing ownership control so that when ownership control is restored, the restoration of ownership control may be restored to the correct user. In this way, the assignment module 440 may change ownership control of the object between a first account and a second account.

The permissions data store 426 may store access permissions to an object. Access permission may include which access permissions a user may have been granted for an object, for instance.

The event detection module 442 may detect a security event to initiate change of ownership control by the assignment module. Some examples of security events may include an account logging into a system, an account logging out of a system, an account navigating into a directory in a directory structure, an account navigating out of a directory in a directory structure, launching a program object, or a duration of elapsed time from an account authentication. The permissions module 444 may change access permissions to an object. For example, the permissions module 444 may make the object read-only.

In addition to the data terminal 410 running a shell based interface such as SSH, the data terminal may also be an example of a client running a browser. Moreover, client applications (e.g., a web application) may run within the browser on the data terminal 410, for example, to interface with the user. Additionally the data terminal 410 may also include a client application that may run outside a browser or shell based interface. Whether the data terminal 410 includes a shell based interface, an application running within a browser or an application running outside a browser, the data terminal may generally include some common functionality. For example, the data terminal may have the ability to trigger security events. (e.g. logging in or out of the computing device 412, navigating throughout the computing device 412, etc.).

Based on the aforementioned parameters, the data terminal may be a device such as, but not limited to, a desktop computer, a laptop, a tablet, a mobile device, a television, a cell phone, a smart phone, a hand held messaging device, a set-top box, a gaming console, a custom data assistant, an electronic book reader, heads up display (HUD) glasses, or any device with a display that may receive and present the information.

The computing device 412 may comprise, for example, a server computer or any other system providing computing capability. Alternatively, a plurality of computing devices 412 may be employed that are arranged, for example, in one or more server banks or computer banks or other arrangements. For purposes of convenience, the computing device 412 may be referred to in the singular, but it is understood that a plurality of computing devices 412 may be employed in various arrangements as described above.

Various processes and/or other functionality, as discussed herein, may be executed in the system 400 according to various examples. The computing device 412, may for example, provide some central server processing services while the data terminal 410 may provide local processing services and interface processing services to interface with the services of the computing device 412. Therefore, it is envisioned that processing services, as discussed herein, may be a centrally hosted functionality and/or a virtualized service or an independent service application that may receive requests and provide output to other services or customer devices.

For example, services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service. Like the various processing capabilities on the data terminal 410 a processor 416 may provide processing instructions by communicating with a memory 416 on the computing device 412. That is, the memory device may include instructions operable to be executed by the processor to perform a set of actions. The processor 414 and/or the memory 416 may directly or indirectly communicate with a data store 418.

Various data may be stored in the data store 418 that are accessible to the computing device 412. The term "data store" may refer to any device or combination of devices capable of storing, accessing, organizing and/or retrieving data, which may include any combination and number of data servers, relational databases, object oriented databases, virtualized storage systems, data storage devices, data warehouses, flat files and data storage configuration in any centralized, distributed, or clustered environment. The storage system components of the data store 418 may include storage systems such as a SAN (Storage Area Network), cloud storage network, volatile or non-volatile RAM, optical media, or hard-drive type media. The data store 418 may be representative of a plurality of data stores 418.

Figure 5:
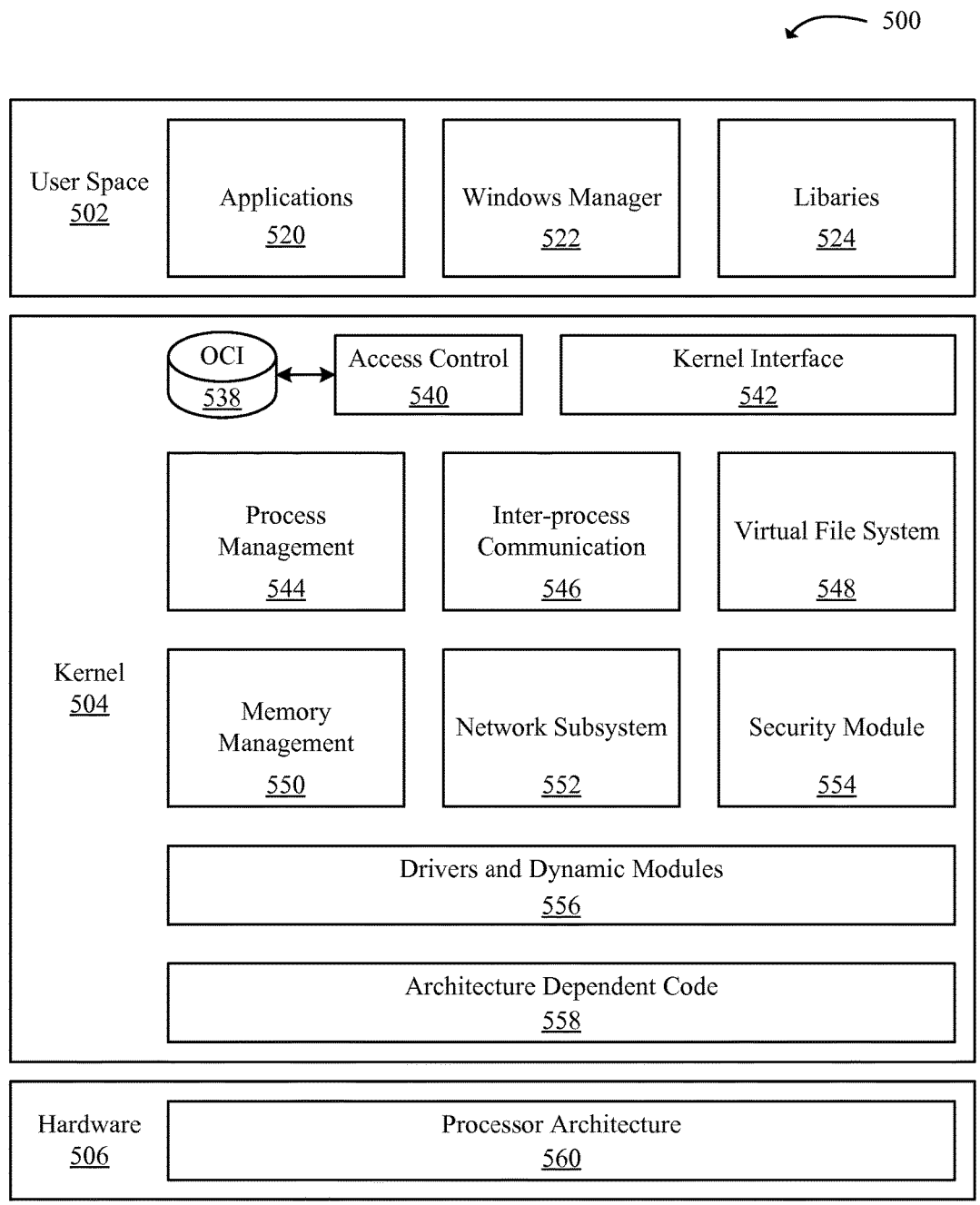
FIG. 5 is a component block diagram illustrating an example of operating system architecture using the access control technology.

FIG. 5 is a component block diagram illustrating an example of an operating system architecture 500. The operating system architecture 500 may include a hardware layer 506 such as the processor architecture 560. More particularly, the processor architecture, also known as an instruction set architecture (ISA), may define how a computer processor is programmed, including defining the native data types, instructions, registers, addressing modes, memory architecture, interrupt and exception handling, and external I/O. An ISA may include a specification of the set of operation codes (e.g. machine language known as opcodes), and the native commands implemented by a particular processor.

The ISA may generally be the programming model of a processor and mirrors the basic instructions used by an assembly language assembler or compiler implemented for the processor. The ISA may include the execution model, processor registers, address and data formats among other things. The microarchitecture includes the constituent parts of the processor and how these interconnect and interoperate to implement the ISA.

The hardware layer 506 of the operating system architecture 500 provides software to the ISA and other hardware devices such as basic input and output (I/O). In particular, the hardware layer 506 is implemented with the ISA to be capable of being executed on the processor architecture.

On top of the hardware layer 506 a kernel layer 504 may manage application programs through process 544 and memory management 550. Additionally the kernel layer 504 may provide inter-process communication 546 between various application programs and provide more abstract I/O requests such as providing a virtual file system and access mechanism 548 and network access 552. Additionally, other components connected to the computer may be loaded and interacted with using drivers and dynamic modules 556 in order to make the operating system architecture 500 more modular. There may also be some additional architecture dependent code 558 aside from the ISA interface at the hardware layer 506, and a security module 554 may also be incorporated within the kernel layer 504. The kernel layer 504 may also include a kernel interface 542.

On top of the kernel layer 504, a user space layer 502 provides an area where application programs 520, a windows manager 522 and libraries 524 may be run by various users. While this description details a particular operating system architecture, it is understood that some variations are within the scope of the disclosed technology.

The above described functionality may be implemented within the kernel layer 504 and/or within the user space 502. If a portion of the functionality is implemented within the user space 502, ideally a user account may have a more secure authentication mechanism such as a strong password. For example a superuser account may be used which has strong authentication. The superuser account may be an account that does not have a user of higher authority above the account. In this way, a higher account may not be able to tamper with the superuser by disabling or forcing a password reset. Thus, the superuser may be a more secure account than a non-superuser account. Implementation may be had through a variety of means including a compiled application program or through a superuser script to be run by the superuser account.

Implementation within either the kernel layer 504 or the user space layer 502 may include implementing functions such as storing ownership control information for the object (e.g. as depicted by an ownership control information data store 538) or changing ownership control of the object or restoring ownership control of the object (e.g. as depicted by an access control module 540). Additionally, these functions may be implemented in part in both the kernel layer 504 and the user space layer 502. For example, an assignment module may be implemented within the kernel layer 504 while an event detection module is implemented within the user space layer 502.

Figure 6A:
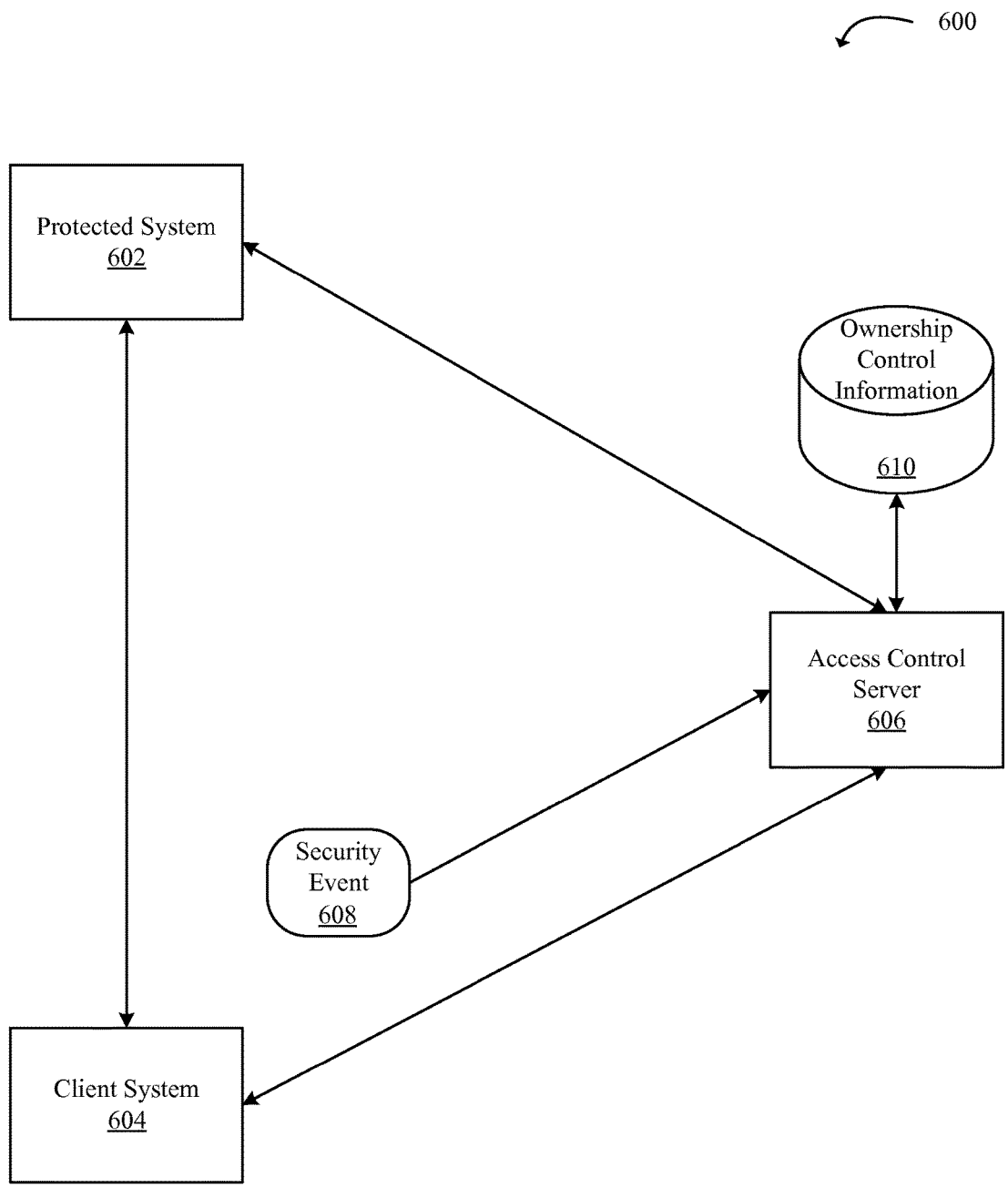
FIG. 6A illustrates an example of a schematic overview of access control with an access control server being used to secure a protected system.

FIG. 6A illustrates an example of a schematic overview of access control 600 with an access control server 602 being used to secure a protected system 602. In addition to the data terminal 410 accessing the computing device 412 with the computing device 412 providing the access control, as discussed with reference to FIG. 4, the access control server 602 may mediate access from a client system 604 to the protected system 602. In this way a user account for implementing the described technology may not have to be tied to an individual computing system.

For example, the protected system 602 may be a group of individual computing systems and the access control server 606 may thereby provide a functional interface for controlling access to objects, services or nodes in the group of individual computing systems. As another example, the protected system 602 may be a set of components and services in a private network. In a virtualized compute service environment, as described below with reference to FIG. 7, the access control server 606 may provide access control to virtualized compute services for a tenant account in the virtualized compute service environment. In this way a user account may be designated within the virtualized compute service to control access using the described technology. The user, for example, may be an administrator account within the virtualized compute service. While various user interfaces may be provided to effectuate access control using the access control server, a particular example is provided in further detail below with reference to FIG. 8. Similar to previous examples, the access control server 606 may be initiated by a security event 608 and may store and retrieve ownership control information from a data store 610.

Figure 6B:
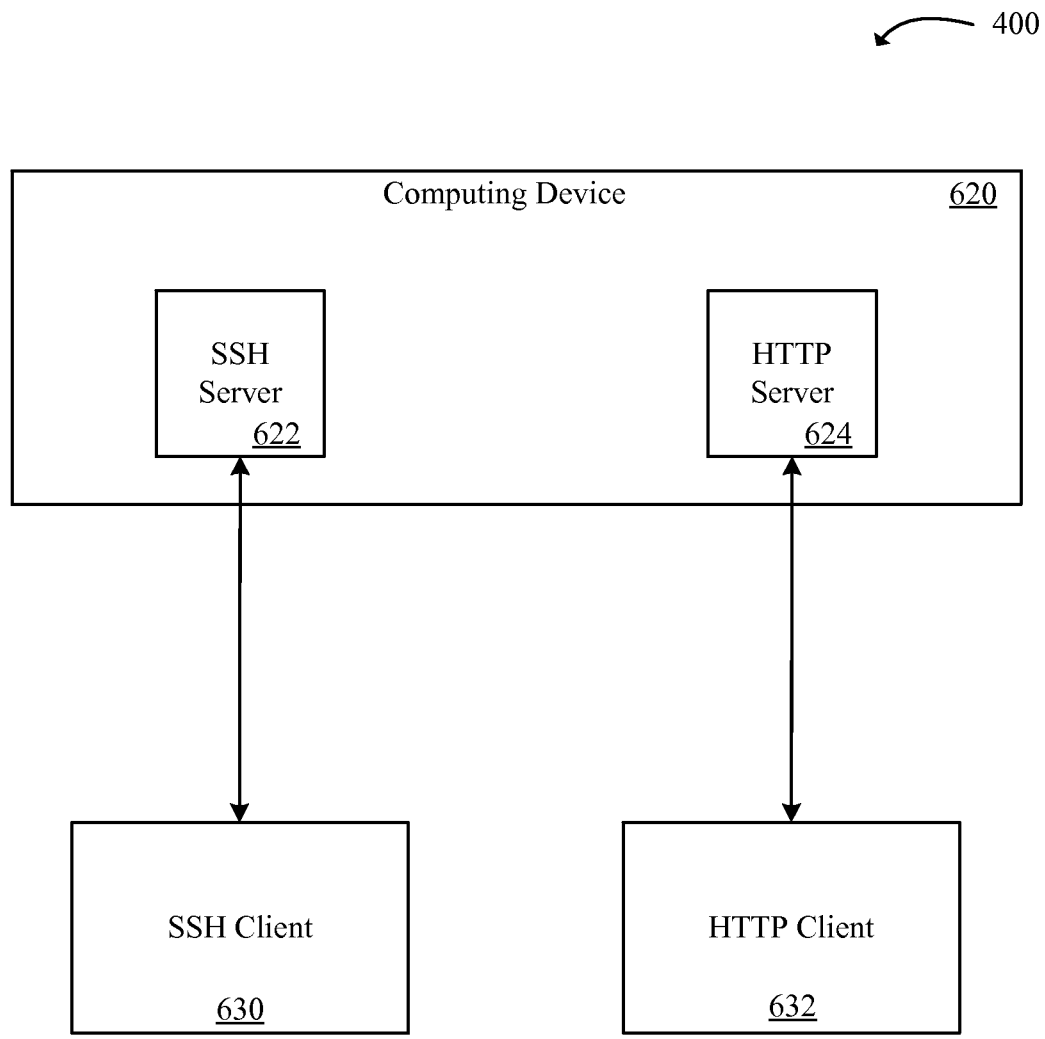
FIG. 6B illustrates an example of a schematic overview of access control with two different client access mechanisms.

FIG. 6B illustrates an example of a schematic overview of access control with two different client access mechanisms. The computing device 620 may include a hypertext transfer protocol (HTTP) server 624 that is accessed by one or more HTTP clients 632. The HTTP server 624, for example, may host a widely visited site. The computing device 620 may also include a secure shell (SSH) server 622 that can be accessed with a SSH client 630. Accessing the computing device 620 using the SSH client 630 may include a robust authentication mechanism including storing and/or exchanging cryptographic keys. Accessing the computing device 620 using an HTTP client, however, may use little or no authentication. In this way, the technology may be used to secure files or other objects accessible by the HTTP server 624 such that they are not editable unless the SSH client 630 has been properly logged into the computing device 620.

Figure 7:
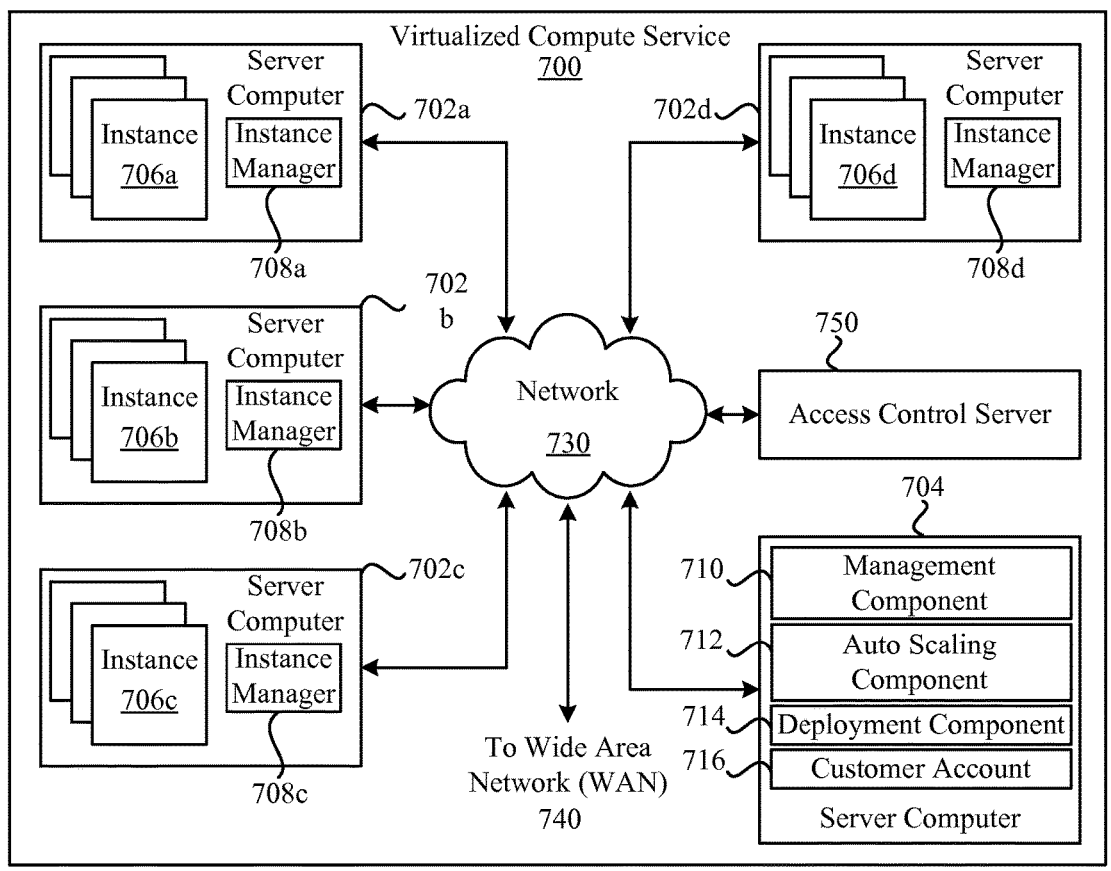
FIG. 7 illustrates an example of a virtualized compute service that may be secured using access control.

FIG. 7 illustrates an example of a virtualized compute service that may be secured using access control. The virtualized compute service may include an access control server 750. In particular, the virtualized compute service 700 is depicted that illustrates one environment in which the technology described herein may be used. The virtualized compute service 700 is one type of environment that access control may manage on a larger system wide basis across many individual computer instances. For example logging into and out of the interface described with reference to FIG. 8 may be examples of security events triggering a change, removal and/or restoration of ownership control to one or more objects across the virtualized compute service 700.

The virtualized compute service 700 (i.e., the cloud provider) is capable of delivery of computing and storage capacity as a service to a community of end recipients. In one example, the virtualized compute service can be established for an organization by or on behalf of the organization. That is, the virtualized compute service 700 may offer a "private cloud environment." In another example, the virtualized compute service 700 supports a multi-tenant environment, such that a plurality of customers operate independently (i.e., a public cloud environment). Generally speaking, the virtualized compute service 700 can provide the following models: Infrastructure as a Service ("IaaS"), Platform as a Service ("PaaS"), and/or Software as a Service ("SaaS"). Other models can be provided. For the IaaS model, the virtualized compute service 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the virtualized compute service platform without the cost of buying and managing the underlying hardware and software. The SaaS model allows installation and operation of application software in the virtualized compute service. End users may access the virtualized compute service 700 using networked client devices, such as desktop computers, laptops, tablets, smartphones, etc. running web browsers or other lightweight client applications, for example. Those skilled in the art will recognize that the virtualized compute service 700 can be described as a "cloud" environment.

The particularly illustrated virtualized compute service 700 includes a plurality of server computers 702*a-d*. While only four server computers are shown, any number can be used, and large centers can include thousands of server computers. The server computers 702*a-d* can provide computing resources for executing software instances 706*a-d*. Instances 706*a-d* may, for example, be virtual machines. As known in the art, a virtual machine is an instance of a software implementation of a machine (i.e. a computer) that executes applications like a physical machine. In the example of virtual machine, each of the servers 702*a-d* can be configured to execute an instance manager 708*a-d* capable of executing the instances. The instance manager 708*a-d* can be a hypervisor or another type of program configured to enable the execution of multiple instances 706 on a single server. Additionally, each of the instances 706 can be configured to execute one or more applications.

It should be appreciated that although the discussion herein is primarily in the context of virtual machines, other types of instances can be utilized with the concepts and technologies disclosed herein. For instance, the technologies disclosed herein can be utilized with storage resources, data communications resources, and with other types of computing resources. The technology might also execute all or a portion of an application directly on a computer system without utilizing virtual machine instances.

One or more server computers 704 can be reserved for executing software components for managing the operation of the server computers 702 and the instances 506. For example, a server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. An auto scaling component 712 can scale the instances 706 based upon rules defined by the customer. The auto scaling component 712 may allow a customer to specify scale-up rules for use in determining when new instances should be instantiated and scale-down rules for use in determining when existing instances should be terminated, for example. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 may be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714.

Customer account information 716 can include any desired information associated with a customer of the multi-tenant environment. For example, the customer account information may include a unique identifier for a customer, a customer address, billing information, licensing information, customization parameters for launching instances, scheduling information, auto-scaling parameters, etc. As described above, the customer account information 716 may also include security information used in encryption of asynchronous responses to API requests. By "asynchronous" it is meant that the API response can be made at any time after the initial request and with a different network connection.

A network 730 can be utilized to interconnect the server computers 702*a*-*d* and the server computers 704, 750. The network 730 can be a local area network (LAN) and can be connected to a Wide Area Network (WAN) 740 so that end users can access the virtualized compute service 700. It should be appreciated that the network topology illustrated in FIG. 5 has been simplified and that many more networks and networking devices can be utilized to interconnect the various computing systems disclosed herein. The above described services and devices provided to the community of end recipients are a few examples of virtualized service resources that may be used with the access control technology described herein.

Figure 8:
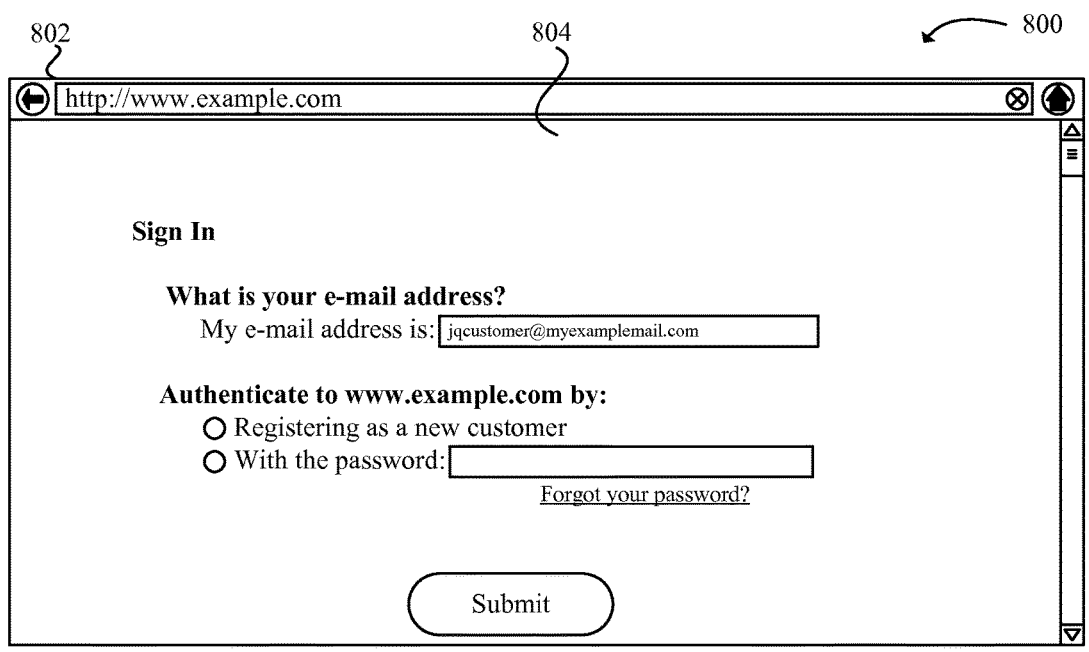
FIG. 8 is an example interface to logon to a virtualized compute service that may be secured using access control.

FIG. 8 is an example interface 800 to logon to a virtualized compute service that may be secured using access control. The interface includes a page 804 rendered within a browser 802. The page 804 may include an e-mail and password combination or may use any other means to authenticate the user. For instance, the page 804 may allow selection of a certificate or key, or may use a smart card reader to verify authenticity of the user.

Once authenticated, ownership control of an object may be restored to the user as previously described. The object may reside on the same computing system that hosts the page 804 or may be elsewhere within, for example, the virtualized compute service described with reference to FIG. 7.

Figure 9:
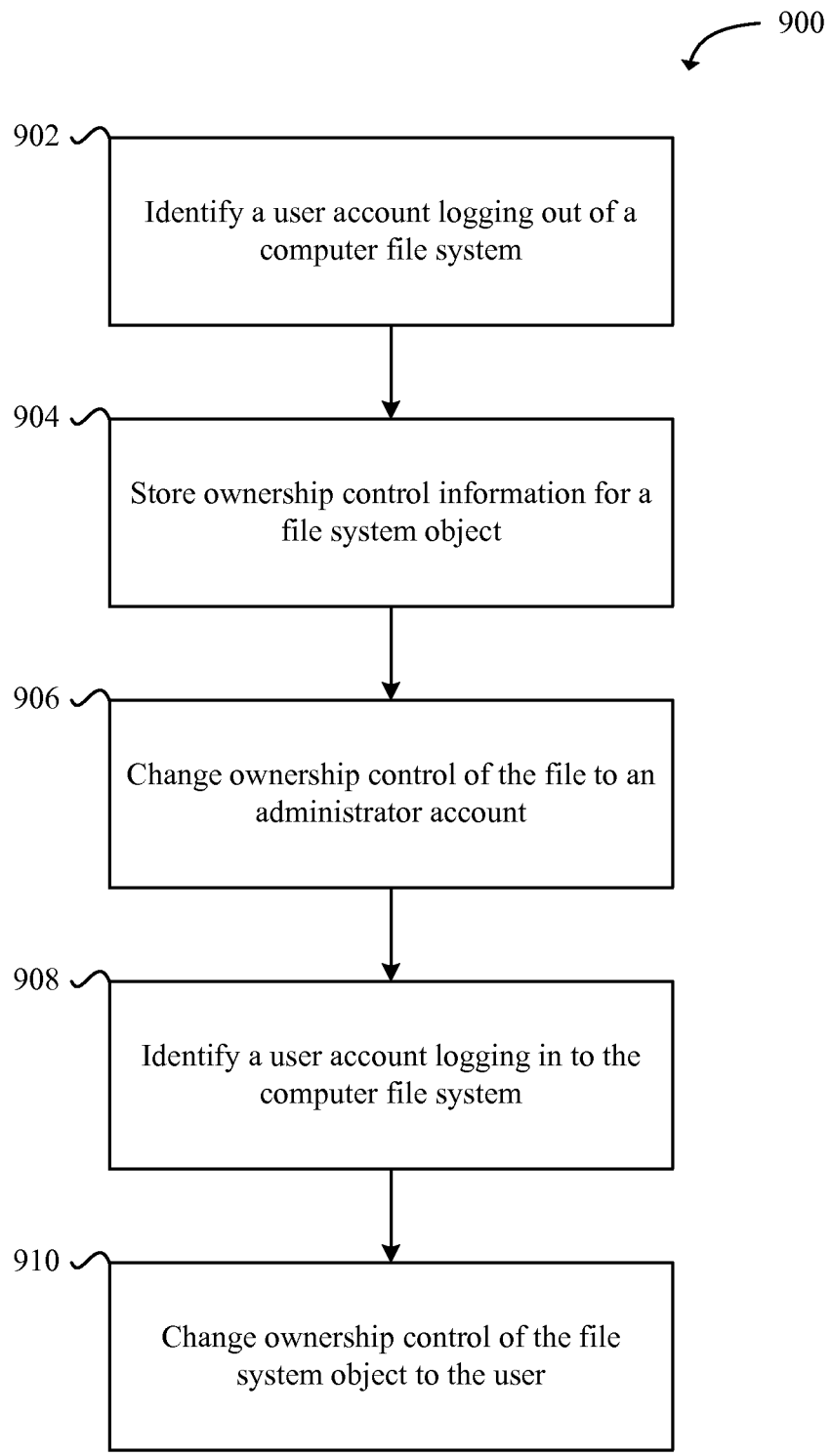
FIGS. 9-10 are flowcharts illustrating example methods to control access.

FIG. 9 is a flowchart illustrating example method 900 to control access. The method may include identifying a user account logging out of a computer file system having file system access control based in part on user accounts having ownership control of file system objects in the computer file system, as shown in method element 902, and storing ownership control information for a file system object in the computer file system upon identifying the user account logging out of the computer file system, as shown in method element 904. File system objects may designate a user that has ownership control of a file system object. Ownership control information may need to be stored before changing ownership control so that when ownership control is restored, the restoration of ownership control may be made to the correct user. The user account may have ownership control of the file. The method may also include changing ownership control of the file to an administrator account upon identifying the user account logging out of the computer file system, as shown in method element 906. The method may yet further include identifying a user account logging in to the computer file system, as shown in method element 908, and changing ownership control of the file system object to the user using the stored ownership control information upon detection of the user account logging in to the computer file system, as shown in method element 910.

Figure 10:
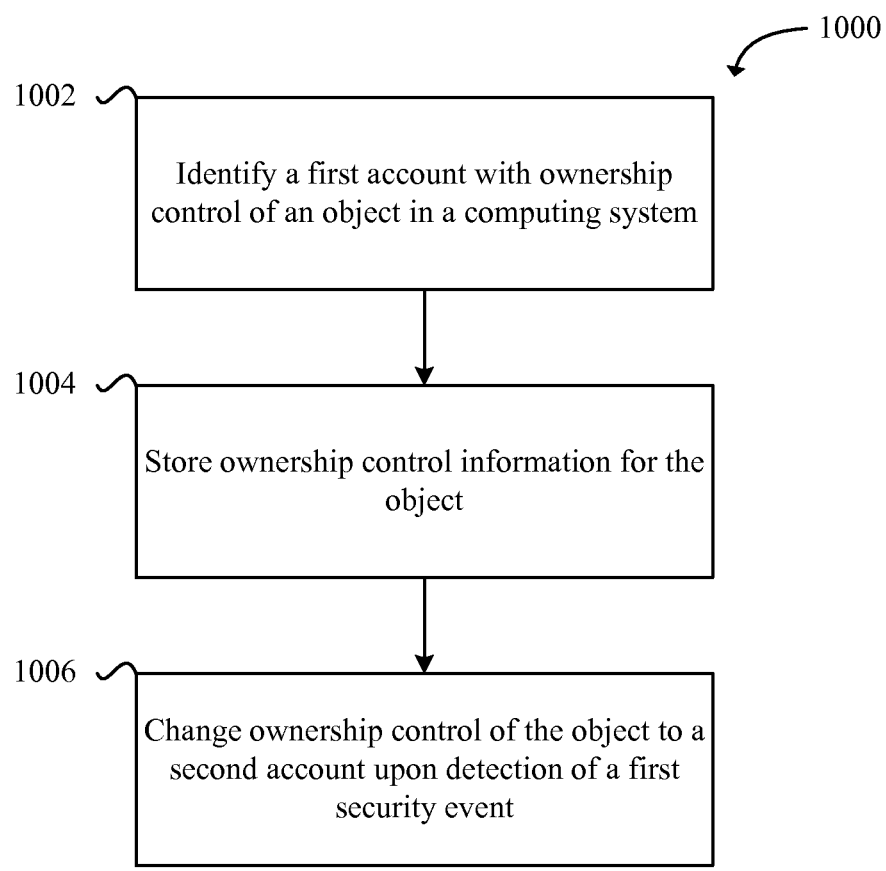

FIG. 10 is a flowchart illustrating example method 1000 to control access. The method may include identifying a first user account with ownership control of an object in a computing system, as shown in method element 1002. The method may also include storing ownership control information for the object, as shown in method element 1004. Access control to objects in the computing system may be based in part on user accounts having ownership control of objects in the computing system. The method may further include changing ownership control of the object to a second user account upon detection of a first security event, as shown in method element 1006.

Figure 11:
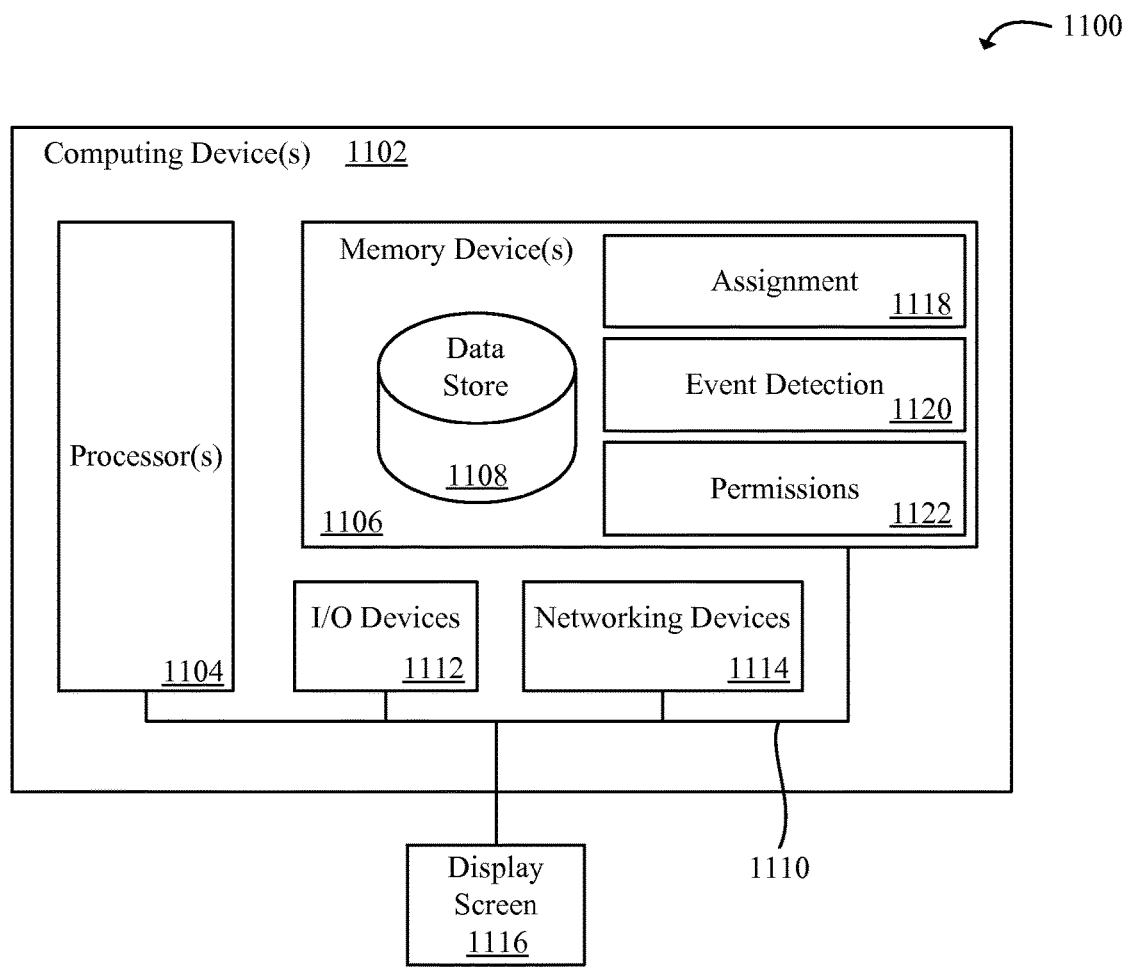
FIG. 11 is block diagram illustrating an example of a computing device that may be used for access control.

FIG. 11 is block diagram illustrating an example of a computing device 1100 that may be used for access control. In particular, the computing device 1102 illustrates a high level example of a device on which modules of the disclosed technology may be executed. The computing device 1102 may include one or more processors 1104 that are in communication with memory devices 1106. The computing device 1102 may include a local communication interface 1114 for the components in the computing device. For example, the local communication interface 1114 may be a local data bus and/or any related address or control busses as may be desired.

The memory device 1106 may contain modules that are executable by the processor(s) 1104 and data for the modules. Located in the memory device 1106 are modules executable by the processor. For example, an assignment module 1118, an event detection module 1120, a permissions module 1122 and other modules may be located in the memory device 1106. The modules may execute the functions described earlier. For instance, the assignment module 1118 may change ownership control of the object between a first account and a second account. The event detection module 1120 may detect a security event to imitate change of ownership control by the assignment module 1118. The permissions module 1122 may change access permissions to an object. While the permissions module 1122 is depicted as being a separate module, the permissions module may be contained in or integrated with the assignment module 1118. Indeed it is envisioned that the functionality described above may be grouped together or divided in a variety of ways so long as the functionality is implement as heretofore described.

A data store 1108 may also be located in the memory device 1106 for storing data related to the modules and other applications along with an operating system that is executable by the processor(s) 1104. For instance, the data store 1108 may include an object data store for storing objects in a computing system. The data store 1108 may store ownership control and access permissions information.

Other applications may also be stored in the memory device 1106 and may be executable by the processor(s) 1104. Components or modules discussed in this description that may be implemented in the form of software using high programming level languages that are compiled, interpreted or executed using a hybrid of the methods.

The computing device may also have access to I/O (input/output) devices 1110 that are usable by the computing devices. An example of an I/O device is a display screen 1116 that is available to display output from the computing devices. Other known I/O devices may be used with the computing device as desired. Networking devices 1112 and similar communication devices may be included in the computing device. The networking devices 1112 may be wired or wireless networking devices that connect to the internet, a LAN, WAN, or other computing network.

The components or modules that are shown as being stored in the memory device 1106 may be executed by the processor(s) 1104. The term "executable" may mean a program file that is in a form that may be executed by a processor 1104. For example, a program in a higher level language may be compiled into machine code in a format that may be loaded into a random access portion of the memory device 1106 and executed by the processor 1104, or source code may be loaded by another executable program and interpreted to generate instructions in a random access portion of the memory to be executed by a processor. The executable program may be stored in any portion or component of the memory device 1106. For example, the memory device 1106 may be random access memory (RAM), read only memory (ROM), flash memory, a solid state drive, memory card, a hard drive, optical disk, floppy disk, magnetic tape, or any other memory components.

The processor 1104 may represent multiple processors and the memory device 1106 may represent multiple memory units that operate in parallel to the processing circuits. This may provide parallel processing channels for the processes and data in the system. The local communication interface 1114 may be used as a network to facilitate communication between any of the multiple processors and multiple memories. The local communication interface 1114 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method of securing file system access control, comprising:
    under control of one or more computer systems configured with executable instructions:
        identifying a user account logging out of a computer file system having file system access control based in part on user accounts having ownership control of file system objects in the computer file system, wherein the user account was accessed with a first authentication mechanism upon a first login;
        storing ownership control information within an ownership control data store for a file system object upon identifying the user account logging out of the computer file system, wherein the user account has ownership control of the file, wherein the ownership control information indicates at least one of read, write, or execution access permissions for the file;
        changing ownership control of the file to an administrator account, by assigning ownership control of the file to the administrator account having an additional authentication process to provide a more rigorous security authentication as compared to the user account, upon identifying the user account logging out of the computer file system;
        identifying the user account logging in to the computer file system;
        changing ownership control of the file system object to the user using the ownership control information upon detection of the user account logging in to the computer file system; and
        restoring ownership control of the file system objects to the user account upon detection of a second login with the first authentication mechanism using the stored ownership control information.

2. The method of claim 1, wherein storing ownership control information comprises writing ownership control information to a file in the computer file system.

3. The method of claim 1, further comprising changing access permissions of the file system object to read-only.

4. The method of claim 1, wherein the administrator account is a superuser account requiring the additional authentication process, wherein the additional authentication process includes at least one of a biometric authentication, password authentication, smart card authentication, or a security hardening operation for gaining access to the computer file system.

5. The method of claim 1, wherein the computer file system hosts files for an Internet site.

6. A computer implemented method, comprising:
    under control of one or more computer systems configured with executable instructions:
        identifying a first account with ownership control of an object in a computing system, wherein access control to objects in the computing system is based in part on accounts having ownership control of objects in the computing system based on a first authentication mechanism;
        storing ownership control information for the object upon identifying a first security event that includes the first account logging out of the computing system, wherein the ownership control information indicates at least one of read, write, or execution access permissions for the file;
        changing ownership control of the object to a second account, by assigning ownership control of the object to a superuser account, having an additional authentication process to provide a more rigorous security authentication as compared to the user account and operating within an operating system running on the computing system, upon detection of the first security event; and
        restoring ownership control of the object to the first account upon detection of a second security event with the first authentication mechanism using the stored ownership control information.

7. The method of claim 6, wherein the first authentication mechanism is selected from the group of authentication mechanism consisting of: a password, a certificate, and a smart card reader.

8. The method of claim 6, wherein the first or second security event is based in part on at least one of an account logging into a system, an account logging out of a system, an account navigating into a directory in a directory structure, an account navigating out of a directory in a directory structure, or a duration of elapsed time from an account authentication.

9. The method of claim 6, further comprising changing access permissions to the object in the computing system to read-only.

10. The method of claim 6, wherein the additional authentication process includes at least one of a biometric authentication, password authentication, smart card authentication, or a security hardening operation for gaining access to the computing system.

11. The method of claim 6, wherein at least one of storing ownership control information for the object, changing ownership control of the object, or restoring ownership control of the object is implemented as a superuser script to be run by the superuser account.

12. The method of claim 6, wherein at least one of storing ownership control information for the object, changing ownership control of the object, or restoring ownership control of the object is implemented within a kernel of an operating system running on the computing system.

13. The method of claim 6, wherein changing ownership control of the object to a second user account further comprises assigning ownership control of the object to a designated user in a virtualized computer service.

14. The method of claim 6, further comprising providing a hypertext transfer protocol (HTTP) service or a database management system (DBMS) service, wherein the object is accessed by the HTTP service or the DBMS service.

15. An access control system, comprising:
a processor;
a memory device including instructions to be executed by the processor;
an object data store for storing objects in a computing system;
a permissions data store for storing access permissions in a computing system;
an ownership control data store for storing ownership control information about an object in the object data store upon identifying a security event that includes an account logging out of the computing system, wherein access control to objects in the object data store are based in part on accounts on the computing system having ownership control of objects in the object data store, wherein the ownership control information indicates at least one of read, write, or execution access permissions for the file;
an event detection module to detect the security event;
and an assignment module to change ownership control of the object between a first account and a second account wherein the first account is accessed by a first authentication mechanism, by assigning ownership control of the object to the second account having an additional authentication process to provide a more rigorous security authentication as compared to the first account, when the event detection module detects the security event, and to restore ownership control of the object to the first account upon detection of a second login with the first authentication mechanism using the stored ownership control information.

16. The system of claim 15, wherein the event detection module detects at least one of an account logging into a system, an account logging out of a system, an account navigating into a directory in a directory structure, an account navigating out of a directory in a directory structure, or a duration of elapsed time from an account authentication.

17. The system of claim 15, wherein the assignment module also changes access permissions to the object to read-only.

18. The system of claim 15, wherein the assignment module is implemented in part in a kernel of an operating system.

19. The system of claim 15, wherein the first account is an administrator account in a virtualized compute computer service.

20. The system of claim 15, wherein the computing system includes a hypertext transfer protocol (HTTP) server software or a database management system (DBMS) server software, and the object is a operated on by the HTTP server software or the DBMS server software.

* * * * *